(12) United States Patent
Boland et al.

(10) Patent No.: US 10,793,114 B2
(45) Date of Patent: Oct. 6, 2020

(54) WINDSCREEN WIPER DEVICE

(71) Applicant: Tenneco Inc., Lake forest, IL (US)

(72) Inventors: Xavier Boland, Arlon (BE); Jimmy E. Teal, Mohton, PA (US)

(73) Assignee: Trico Products Corporation, Rochester Hills, MI (US)

( * ) Notice: Subject to any disclaimer, the term of this patent is extended or adjusted under 35 U.S.C. 154(b) by 674 days.

(21) Appl. No.: 13/678,863

(22) Filed: Nov. 16, 2012

(65) Prior Publication Data

US 2013/0125332 A1 May 23, 2013

Related U.S. Application Data

(60) Provisional application No. 61/589,039, filed on Jan. 20, 2012, provisional application No. 61/561,618, filed on Nov. 18, 2011.

(51) Int. Cl.
| | |
|---|---|
| *B60S 1/40* | (2006.01) |
| *B60S 1/04* | (2006.01) |
| *B60S 1/38* | (2006.01) |

(52) U.S. Cl.
CPC .............. *B60S 1/40* (2013.01); *B60S 1/0408* (2013.01); *B60S 1/38* (2013.01); *B60S 1/3877* (2013.01); *B60S 1/3808* (2013.01); *B60S 2001/3827* (2013.01); *B60S 2001/3829* (2013.01); *B60S 2001/3898* (2013.01)

(58) Field of Classification Search
CPC .... B60S 2001/3829; B60S 1/381; B60S 1/38; B60S 1/3808; B60S 1/3879; B60S 2001/3827; B60S 1/0408

USPC ............ 15/250.201, 250.32, 250.41, 250.36, 15/250.42, 250.48, 250.001, 250.361
See application file for complete search history.

(56) References Cited

U.S. PATENT DOCUMENTS

| | | | | |
|---|---|---|---|---|
| 2,952,865 | A * | 9/1960 | Rohr | B60S 1/3801 15/250.48 |
| 3,040,359 | A * | 6/1962 | Deibel | B60S 1/3801 15/250.4 |
| 3,572,730 | A | 3/1971 | Otto | |

(Continued)

FOREIGN PATENT DOCUMENTS

| | | |
|---|---|---|
| CN | 1663853 A | 9/2005 |
| DE | 102009040251 A1 | 4/2010 |

(Continued)

OTHER PUBLICATIONS

WO 2011/026512 Full-Text.*

(Continued)

*Primary Examiner* — Gary K. Graham
(74) *Attorney, Agent, or Firm* — Miller Canfield (57) ABSTRACT

A windscreen wiper device is provided including a longitudinally extending wiper strip of a flexible material. At least one carrier of a spring-like material operatively supports and biases the wiper strip into a predetermined configuration. The windscreen wiper device further includes a connecting device for connection with a wiper arm. At least a portion of the wiper strip has a microtextured surface formed directly into the flexible material. The microtextured surface may be on, for example, any one of or any combination of a wiping portion, a channel, a hinge portion and a spoiler portion of the wiper strip.

10 Claims, 5 Drawing Sheets

(56) References Cited

U.S. PATENT DOCUMENTS

| | | | |
|---|---|---|---|
| 3,586,340 | A | 6/1971 | Otto |
| 4,423,544 | A | 1/1984 | Kashmerick et al. |
| 4,834,400 | A | 5/1989 | Lebeck |
| 6,149,160 | A | 11/2000 | Stephens et al. |
| 6,244,409 | B1 | 6/2001 | Winkelmann et al. |
| 6,273,231 | B1 | 8/2001 | Koschmieder et al. |
| 6,279,191 | B1 | 8/2001 | Kotlarski et al. |
| 6,502,682 | B2 | 1/2003 | Koschmieder et al. |
| 6,661,895 | B1 | 9/2003 | James |
| 6,634,055 | B1 * | 10/2003 | De Block ............. B60S 1/3858 15/250.32 |
| 6,874,195 | B2 * | 4/2005 | Kotlarski ............. B60S 1/3808 15/250.201 |
| 6,902,168 | B2 | 6/2005 | Tejima |
| 7,007,340 | B1 | 3/2006 | James |
| 7,194,803 | B2 | 3/2007 | Young et al. |
| 7,500,676 | B2 | 3/2009 | Tejima |
| 7,555,806 | B1 | 7/2009 | James |
| 7,708,090 | B2 | 5/2010 | Zahradnik et al. |
| 7,735,184 | B2 * | 6/2010 | Westbrook ............ B60S 1/3801 15/245 |
| 7,735,834 | B2 | 6/2010 | Hofbauer |
| 2002/0149158 | A1 | 10/2002 | Havercamp et al. |
| 2004/0026868 | A1 | 2/2004 | Dahlheimer |
| 2007/0022556 | A1 * | 2/2007 | Walworth .............. B60S 1/381 15/250.201 |
| 2008/0088094 | A1 | 4/2008 | Borowski et al. |
| 2009/0047475 | A1 | 2/2009 | Jeon |
| 2009/0096139 | A1 | 4/2009 | Zambotto et al. |
| 2010/0038862 | A1 | 2/2010 | Young |
| 2010/0095472 | A1 | 4/2010 | Van De Rostyne et al. |
| 2010/0119780 | A1 | 5/2010 | Schilling et al. |
| 2011/0018209 | A1 | 1/2011 | Dahlhapreussler |
| 2011/0048810 | A1 | 3/2011 | Lin et al. |
| 2011/0059301 | A1 | 3/2011 | Lay et al. |
| 2011/0197381 | A1 | 8/2011 | Nelson |
| 2011/0272896 | A1 | 11/2011 | Kamibayashiyama et al. |

FOREIGN PATENT DOCUMENTS

| | | | |
|---|---|---|---|
| EP | 0744326 | | 11/1996 |
| EP | 1243489 | A2 | 9/2002 |
| GB | 2348392 | A1 | 4/1975 |
| JP | S57117251 | U | 7/1982 |
| JP | 57146955 | A | 9/1982 |
| JP | 2003182531 | A | 7/2003 |
| JP | 2005145166 | A | 6/2005 |
| JP | 2007131734 | A | 5/2007 |
| WO | 2010124718 | | 11/2010 |
| WO | 2011026512 | A1 | 3/2011 |
| WO | WO 2011026512 | * | 3/2011 ................ B60S 1/38 |
| WO | WO 2011026512 | * | 3/2011 ............ B60S 1/3877 |

OTHER PUBLICATIONS

Machine translation of description portion of EP publication 0744326, published Nov. 1996. (Year: 1996).*

International Search Report PCT/US2012/065435 dated Jan. 8, 2013.

* cited by examiner

WINDSCREEN WIPER DEVICE

CROSS-REFERENCE TO RELATED APPLICATIONS

This application claims the benefit of U.S. Provisional Application Ser. Nos. 61/589,039, filed Jan. 20, 2012, and 61/561,618, filed Nov. 18, 2011, which are incorporated herein by reference in their entireties.

BACKGROUND OF THE INVENTION

1. Field of the Invention

The present invention is generally related to windscreen wiper devices, and more precisely to wiper strips of windscreen wiper devices.

2. Related Art

The wiper strips of typical windscreen wiper devices, or wiper blades, are formed of a rubber material which seals against a vehicle's windshield to drive water, snow or other elements away therefrom. Materials having, among other things, a good resistance to abrasion, a low frictional surface and good slip properties are generally chosen to give the wiper blades a good wipe quality. Oftentimes, a material which improves one or more of these qualities has a negative effect on others. For example, soft rubbers may produce wiper strips which exhibit exceptional wipe quality but also have an undesirably high frictional resistance, which could reduce the lifespans of such wiper blades Some wiper manufacturers have attempted to improve the performance of their wiper blades by applying a coating having hydrophobic properties to the wiper strips. Such coatings allow the wiper strip to be formed of a harder rubber, resulting in reduced friction and longer life, without compromising wipe quality. However, such coatings may be very costly, difficult to apply to the wiper strip and/or may wear out over time, resulting in a reduced wipe quality.

SUMMARY OF THE INVENTION

One aspect of the present invention provides for a windscreen wiper device for a vehicle with improved performance and lifespan. The windscreen wiper deice includes a longitudinally extending wiper strip of a flexible material. At least one carrier of a spring-like material operatively supports and biases the wiper strip into a predetermined configuration. The windscreen wiper device also includes a connecting device for connection with a wiper arm. At least a portion of the wiper strip has a microtextured surface formed directly into the flexible material. The microtextured surface may be configured to improve the wiper strip's resistance to abrasion, reduce the wiper strip's frictional surface and improve the wiper strip's slip properties.

According to another aspect of the present invention, the microtextured surface is formed directly into a wiping portion of the wiper strip. The microtexturing provides the wiping portion with hydrophobic properties to improve the wiper quality of the windscreen wiper device. Additionally, the microtexturing reduces the friction between the wiper strip and the vehicle's windshield, thereby allowing the wiper strip to be formed of a softer material, thus further improving wipe quality without compromising the windscreen wiper device's lifespan.

According to yet another aspect of the present invention, the wiper strip includes a channel for receiving the carrier, and the channel is microtextured. The microtexturing reduces the friction between the wiper strip and the carrier to reduce internal stresses within the wiper strip that could otherwise form when the wiper strip is biased into a curved configuration by the carrier.

According to still another aspect of the present invention, the wiper strip includes a hinge portion that is microtextured. The microtexturing on the hinge portion prevents snow, ice, dust or other debris from becoming lodged in the hinge portion and preventing the wiping portion from pivoting back and forth during when the windscreen wiper device changes direction during operation of the vehicle's wiper blade system.

According to a further aspect of the present invention, the wiper strip includes a spoiler portion that is microtextured. The microtexturing on the spoiler portion could be configured to improve the down-force provided by the spoiler portion or it could be configured to reduce the aerodynamic drag of the wiper blade.

Another aspect of the present invention is a method of making a windscreen wiper device. The method includes the step of forming a longitudinally extending wiper strip of a flexible material and having at least one surface with microtexturing formed directly into the flexible material.

According to yet another aspect of the present invention the forming step is extruding the wiper strip out of an extrusion die having a shaped opening with microtexturing. The microtexturing on the extrusion die forms linearly extending microtextures on the wiper blades extruded therefrom. This may provide manufacturing advantages because the microtexturing may reduce the friction between the material being extruded through the shaped opening and the extrusion die.

According to still another aspect of the present invention, the forming step is injection molding the wiper strip in a mold having a mold cavity with a microtextured surface. The microtexturing on the wiper strips formed in the mold cavity may either be pillar-shaped or they may extend linearly in a manner similar to the microtexturing on wiper strips formed through extrusion.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figures 1, 2:
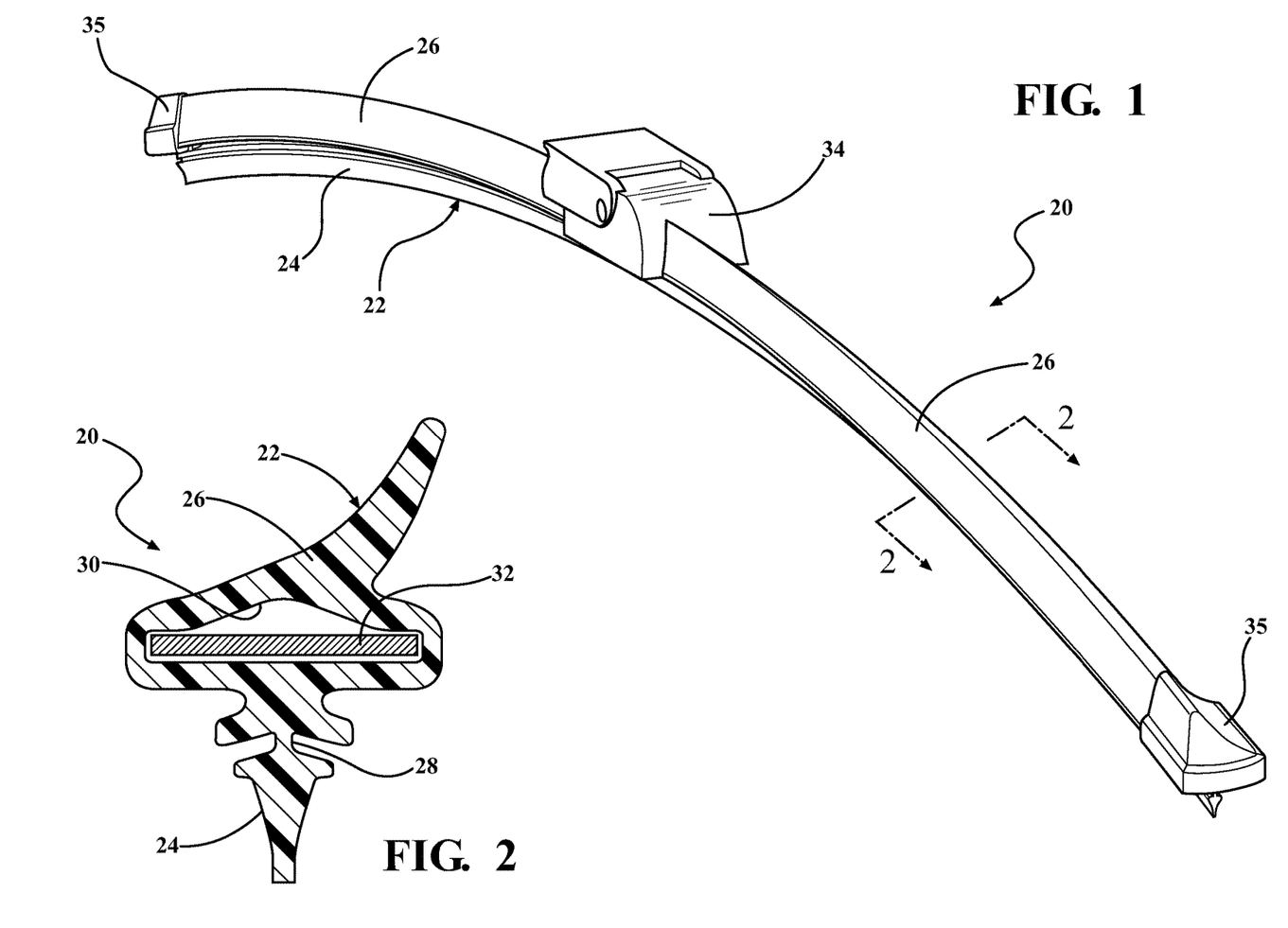
FIG. 1 is a perspective and elevation view of an exemplary windscreen wiper device.
FIG. 2 is a cross-sectional view of the exemplary windscreen wiper device taken through line 2-2 of FIG. 1.

Referring to the Figures, wherein like numerals indicate corresponding parts throughout the several views, an exemplary windscreen wiper device 20 (or a wiper blade) constructed according to one aspect of the invention is generally shown in FIG. 1. Referring now to the cross-sectional view of FIG. 2, the exemplary windscreen wiper device 20 includes a wiper strip 22 having a wiping portion 24, a spoiler portion 26 and a hinge portion 28 all integrally connected to one another and formed as one piece of material with the hinge portion 28 being disposed between the wiping and spoiler portions 24, 26. The spoiler portion 26 presents a longitudinally extending channel 30, and a carrier 32 (sometimes referred to as a "flexor") is disposed in the channel 30. The carrier 32 is of a spring-like material (such as spring steel) and operatively supports and biases the wiper strip 22 into a predetermined configuration. Referring back to FIG. 1, the exemplary windscreen wiper device 20 is a "beam" style device because it lacks the levers and frame found on traditional windscreen wiper devices. As such, the exemplary carrier 32 (shown in FIG. 2) is self-biased into a curved shape to bias the wiper strip 22 into a curved configuration, thereby allowing it to conform to windshields of differing curvatures. The exemplary windscreen wiper device 20 also includes a connecting device 34 for connection with a wiper arm (not shown). Additionally, end caps 35 are secured to either the wiper strip 22 or to the carrier 32 at the ends of the exemplary windscreen wiper device 20. However, it should be appreciated that a traditional style windscreen wiper device having a frame with a plurality of levers and a generally linearly biased carrier could alternately be employed.

Figures 3A, 3B:
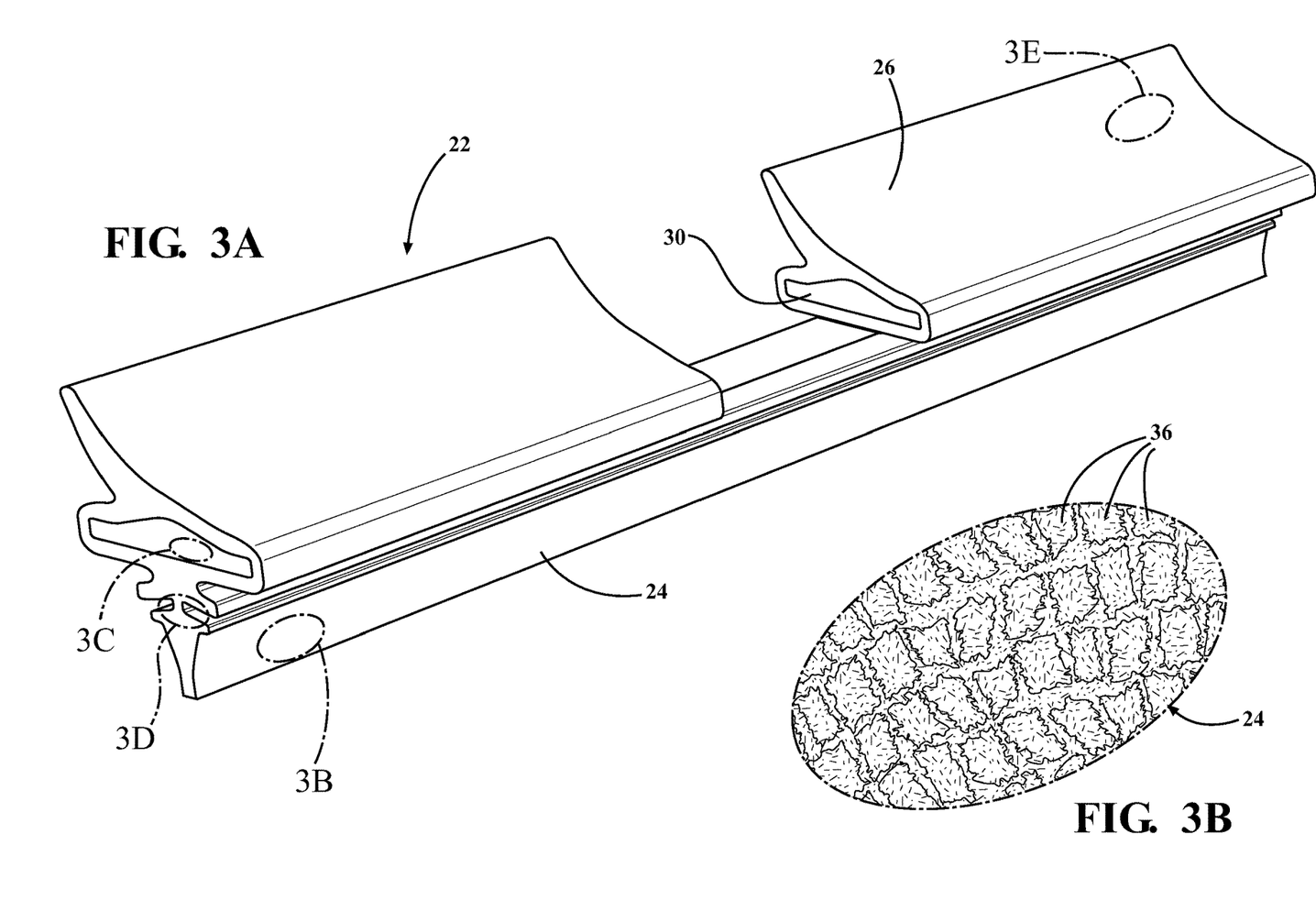
FIG. 3A is a perspective and elevation view of a wiper strip formed through an injection molding process in the windscreen wiper device of FIG. 1.
FIG. 3B is an enlarged view taken of a wiping portion of the wiper strip in FIG. 3A and showing a microtextured surface formed during the injection molding process.

The exemplary one-piece wiper strip 22 is formed of a flexible and elastic material, such as rubber, for sealing against a vehicle's windshield (not shown) and for driving rain, snow or other elements away therefrom. Referring now to FIGS. 3A and 3B, the outer surface of the wiping portion 24 of the exemplary wiper strip 22 is microtextured with a plurality of pillars or other protrusions 36 formed directly into the flexible material and extending generally perpendicularly away from the surrounding areas of the outer surface. This microtexturing gives the wiping portion 24 hydrophobic properties to drive rain and snow away from the windshield, thereby improving the wipe quality of the windscreen wiper device 20 as compared to comparable windscreen wiper devices lacking the microtexturing. Additionally, the microtexturing on the outer surface of the wiping portion 24 reduces the total contact area between the wiper strip 22 and the windshield to reduce the friction between these components. The reduction in the friction between the wiper strip 22 and the windshield allows the wiper strip 22 to be formed of a softer material to further improve wipe quality without compromising the lifespan of the windscreen wiper device 20. The microtexturing also resists the buildup of ice or other debris on the wiping portion 24, thereby further improving the windscreen wiper device's 20 performance.

The protrusions 36 of the microtexturing may have any desirable shape and may even be ridges extending along the length of the wiper strip 22. The protrusions 36 could be arranged in a pattern or they could be randomly arranged relative to one another. Although not shown, the microtextured surface may include one or more cavities in addition to or in place of the protrusions 36. Additionally, the microtexturing could take a range of different configurations to optimize, for example, hydrophobicity, friction reduction or aerodynamic drag.

Figure 3C:
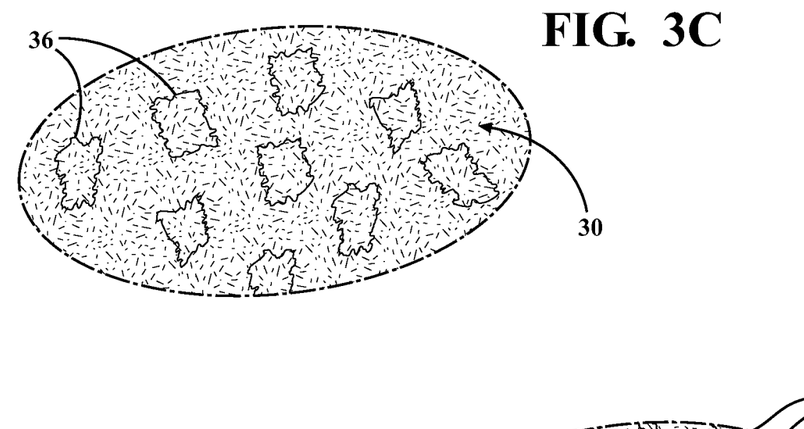
FIG. 3C is an enlarged view of a channel of the wiper strip of FIG. 3A and showing a microtextured surface formed during the injection molding process.

Referring now to FIG. 3C, the exemplary wiper strip 22 additionally includes microtexturing on the walls of the longitudinally extending channel 30 for reducing the friction between the wiper strip 22 and the carrier 32. This improves the performance of the windscreen wiper device 20 by reducing internal stresses within the wiper strip 22 when it is biased by the carrier 32 into the curved configuration shown in FIG. 1. As shown in FIG. 3, the microtexturing on the channel 30 is different than the microtexturing on the wiping portion 24. Specifically, the microtexturing on the channel 30 is optimized only for friction reduction, rather than both friction reduction and hydrophobicity.

Figure 3D:
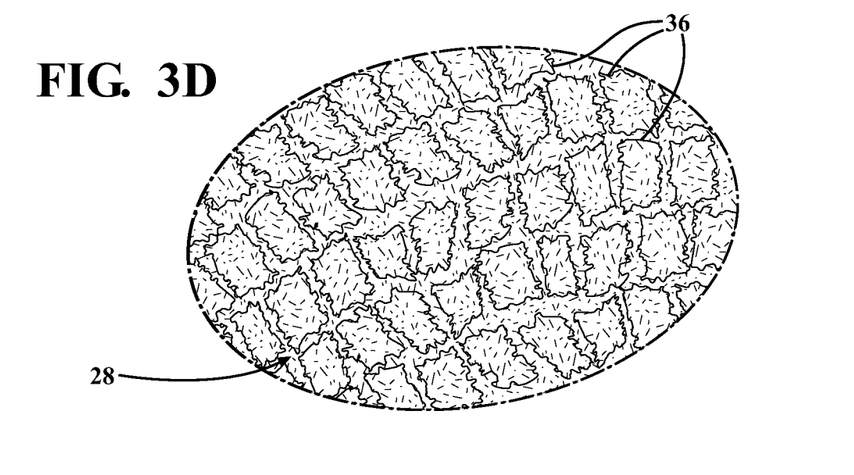
FIG. 3D is an enlarged view of a hinge portion of the wiper strip of FIG. 3A and showing a microtextured surface formed during the injection molding process.

Referring now to FIG. 3D, the exemplary wiper strip 22 also includes a microtextured surface on the hinge portion 28 which is configured differently than he microtexturings on the wiping portion 24 and the channel 30. Specifically, the microtexturing on the hinge portion 28 is optimized to prevent the buildup of snow, ice or dust on the hinge portion 28 which could affect the performance of the windscreen wiper device 20 by preventing or restricting pivoting movement of the wiping portion 24 when the windscreen wiper device 20 changes direction during operation of the vehicle's windshield wiper system.

Figure 3E:
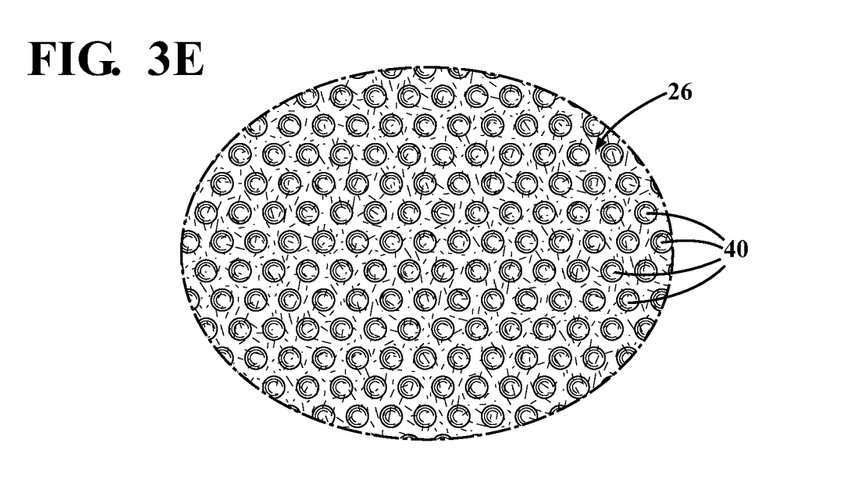
FIG. 3E is an enlarged view of a spoiler portion of the wiper strip of FIG. 3A and showing a microtextured surface formed during the injection molding process.

Referring now to FIG. 3E, the exemplary wiper strip 22 further includes a microtextured surface on the spoiler portion 26 which is configured differently than the microtexturings on the wiping portion 24, channel 30 and hinge portion 28. Specifically, the microtexturing on the spoiler includes a plurality of dimples 40 to reduce the aerodynamic drag of the windscreen wiper device 20. Alternately, the microtexturing could be configured to increase the downforce provided by the spoiler portion 26 to improve the seal between the wiping portion 24 and the windshield when the vehicle is travelling at high speeds.

Figure 6:
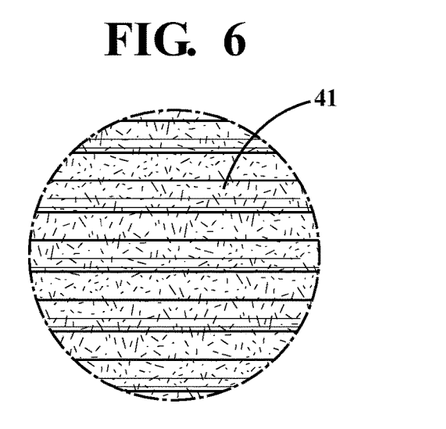
FIG. 6 is an enlarged view showing an exemplary microtextured surface formed through an extrusion process.

The exemplary microtexturings on the wiping portion 24, the channel 30, the hinge portion 28 and the spoiler portion 26 are all point or pillar shaped and formed through an injection molding process. If the wiper strip 22 is formed through an extrusion process, then the microtexturings would extend linearly. For example, the microtexturing shown in FIG. 6 is formed through an extrusion process and includes a plurality of rib-like projections 41 extending generally linearly and in parallel with one another.

Another aspect of the present invention provides for a method of making a windscreen wiper device 20. The method includes the step of forming a longitudinally extending wiper strip 22 of a flexible material and having at least one microtextured surface including a plurality of protrusions 36 and/or cavities formed directly into the flexible material. The at least one microtextured surface could be disposed on any one of or any combination of an outer surface of a wiping portion 24, a wall of an inner longitudinally extending channel 30, an outer surface of a spoiler portion 26 or an outer surface of a hinge portion 28.

Additionally, the microtextured surface or surfaces could be configured to provide hydrophobicity, reduced friction or aerodynamic drag.

Figures 4A, 4B:
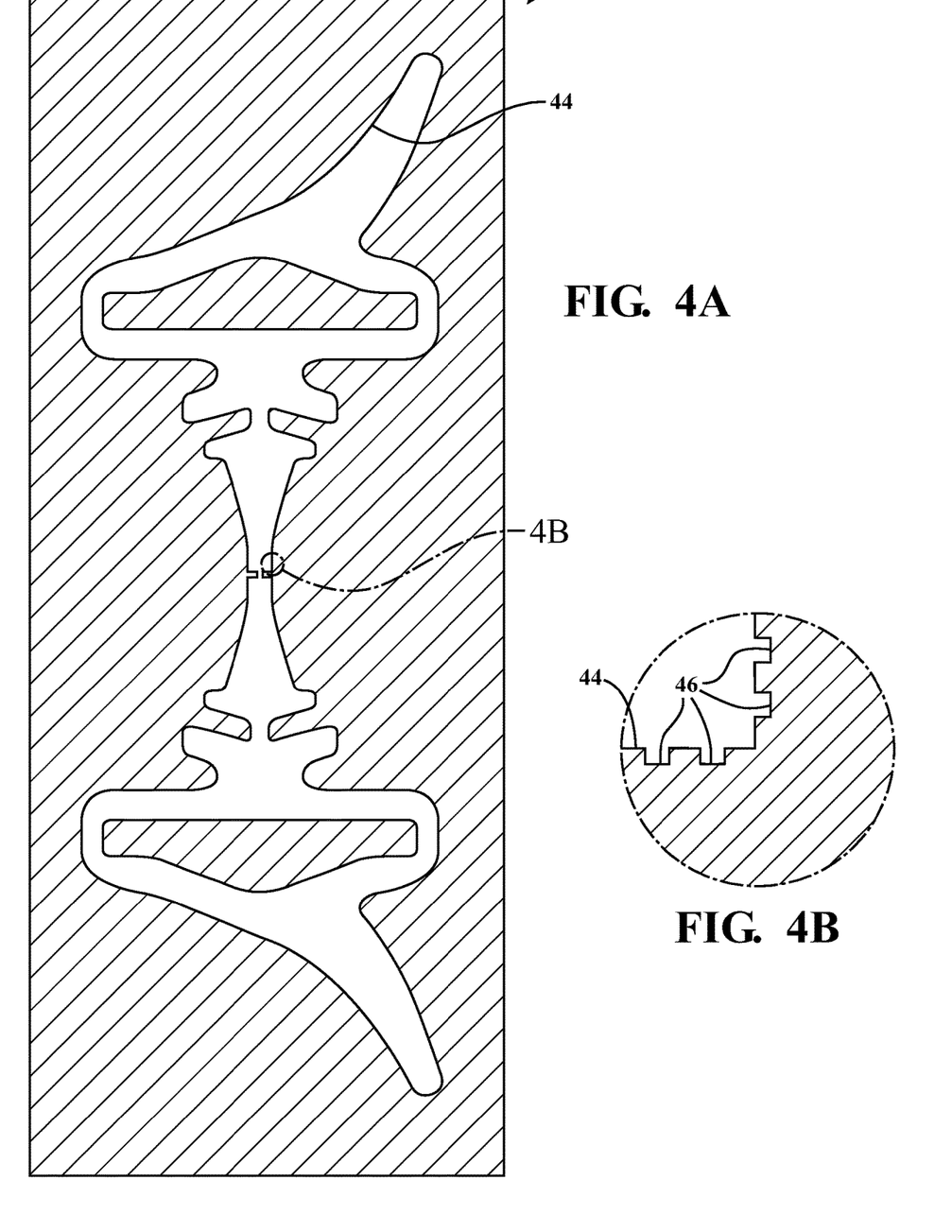
FIG. 4A is a front view of an exemplary extrusion die for extruding a wiper strip.
FIG. 4B is an enlarged view of a portion of the extrusion die of FIG. 4A.

In one embodiment, the step of forming the wiper strip 22 is through an extrusion process using an extrusion die 42, such as the extrusion die 42 shown in FIGS. 4A and 4b. The exemplary extrusion die 42 includes an opening 44 shaped similarly to the profile of the wiper strip 22 shown in FIG. 2 and discussed above. As shown in FIG. 4B, areas of the perimeter of the opening 44 are microtectured with very small notches 46 or grooves. When the rubber (or any other flexible material) is extruded through the shaped opening 44, micro-sized ridges are formed on the wiper strip by these notches 46 to provide the resulting wiper strip 22 with at least one microtextured surface. The notches 46 on the exemplary extrusion die 42 are generally rectangularly shaped. However, it should be appreciated that they could take a wide range of different shapes other than those shown in the drawings. It should also be appreciated that the extrusion die 42 could have a plurality of very small projections in addition to or in place of the notches 46. The notches 46 could be disposed along the entire perimeter of the shaped opening 44, or they could be disposed only in predetermined portions of the opening 44.

In addition to the performance advantages that are provided by the microtextured surfaces on the wiper strips produced from the extrusion die 42, the microtextured surfaces of the extrusion die 42 also provide for manufacturing advantages. Specifically, the microtextured surfaces on the extrusion die 42 may have the effect of reducing friction between the extrusion die 42 and the material being extruded through the opening 44. Less friction at this point in the manufacturing of the wiper strip 22 allows for better control of the extrusion process and reduces the pressure required to urge the rubber through the opening 44 of the extrusion die 42.

Figure 5A:
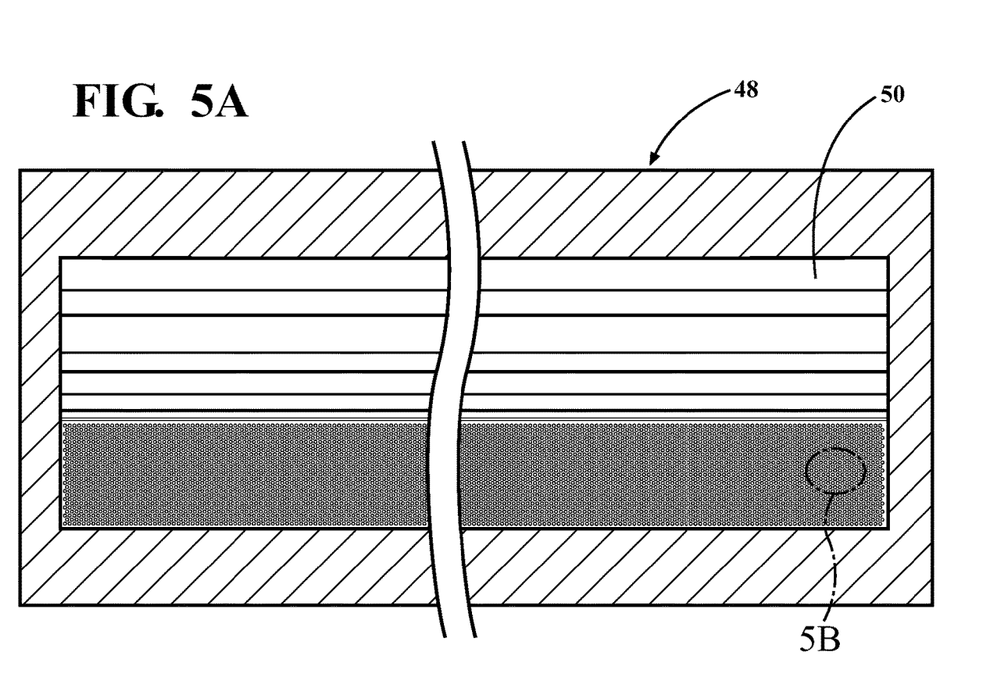
FIG. 5A is a front view of an exemplary mold for injection molding a wiper strip.
Figure 5B:
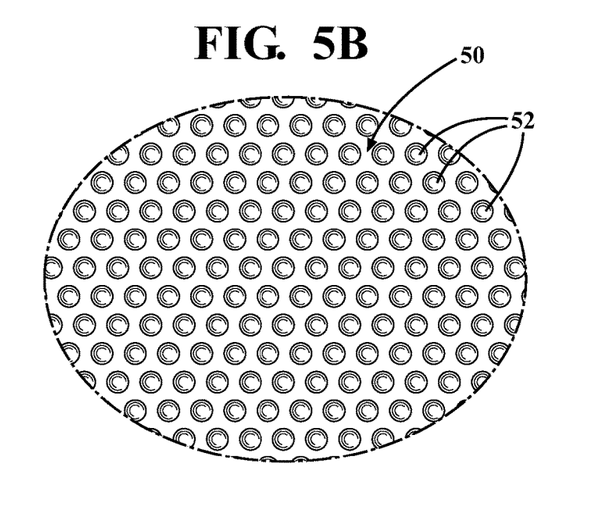
FIG. 5B is an enlarged view of the exemplary mold of FIG. 5A.

In another embodiment, the step of forming the wiper strip 22 is through an injection molding process using a mold 48 (such as the mold 48 shown in FIGS. 5A and 5B) having a mold cavity 50 shaped for injection molding a wiper strip 22. As shown in the enlarged view of FIG. 5b, the mold 48 presents a plurality of recesses 52. Similar to the notches 46 in the extrusion die 42 discussed above, the recesses 52 are very small to form a microtextured surface in the wiper strips injection molded in the mold 48. The recesses 52 could have any desirable shape and could be disposed throughout the mold cavity 50 or they could be disposed only in predetermined portions of the mold cavity 50. For example, it might be preferred to only include the microtextured surface in the portions of the mold cavity 50 that form the wiping portions of the wiper strips.

It is to be understood that the above detailed description is with regard to some presently preferred embodiments, and that other embodiments readily discernible from the disclosure herein by those having ordinary skill in the art are incorporated herein and considered to be within the scope of any ultimately allowed claims.

What is claimed is:

1. A windscreen wiper device, comprising:
   a longitudinally extending wiper strip fabricated of a flexible material and having an outer surface, said wiper strip includes a wiping portion, a hinge portion, and a spoiler portion integrally connected as one piece of said flexible material with one another with said hinge portion being disposed between said wiping and spoiler portions;
   at least one carrier operatively supporting and biasing said wiper strip into a predetermined configuration;
   a connecting device for connection with a wiper arm;
   wherein at least a portion of said outer surface of said wiper strip includes microtextured surface impressions formed directly into said flexible material of said wiper strip, wherein said at least a portion of said outer surface of said wiper strip having microtextured surface impressions includes at least two distinct portions of at least two of said wiping, hinge and spoiler portions; and
   wherein said microtextured surface impressions include a plurality of pillars which are spaced from one another and project from a generally flat base surface.

2. The windscreen wiper device as set forth in claim 1 wherein said microtextured surface impressions are on said hinge portion.

3. The windscreen wiper device as set forth in claim 1 wherein said microtextured surface impressions of said at least two distinct portions have different microtexturing.

4. The windscreen wiper device as set forth in claim 1 wherein said at least one carrier is self-biased into a curved shape to bias said wiper strip into a curved configuration.

5. A windscreen wiper device, comprising:
   a longitudinally extending wiper strip fabricated of a flexible material and having an outer surface, said wiper strip includes a wiping portion, a hinge portion, and a spoiler portion integrally connected as one piece of said flexible material with one another with said hinge portion being disposed between said wiping and spoiler portions;
   at least one carrier operatively supporting and biasing said wiper strip into a predetermined configuration;
   a connecting device for connection with a wiper arm; and
   a longitudinally extending channel formed into said wiper strip, wherein said longitudinally extending channel has a closed geometrical shape, wherein said at least one carrier is disposed in said longitudinally extending channel;
   wherein at least a portion of said outer surface of said wiper strip includes microtextured surface impressions formed directly into said flexible material of said wiper strip, wherein said at least a portion of said outer surface of said wiper strip having microtextured surface impressions includes at least two distinct portions of at least two of said wiping, hinge and spoiler portions; and wherein said microtextured surface impressions are in said channel; and
   wherein said microtextured surface impressions include a plurality of pillars which are spaced from one another and project from a generally flat base surface.

6. The windscreen wiper device as set forth in claim 5 wherein said microtextured surface impressions are on said hinge portion.

7. The windscreen wiper device as set forth in claim 5 wherein said microtextured surface impressions of said at least two distinct portions have different microtexturing.

8. The windscreen wiper device as set forth in claim 5 wherein said at least one carrier is self-biased into a curved shape to bias said wiper strip into a curved configuration.

9. A windscreen wiper device, comprising:
   a longitudinally extending wiper strip fabricated of a flexible material and having an outer surface, said wiper strip includes a wiping portion, a hinge portion, and a spoiler portion integrally connected as one piece of said flexible material with one another with said hinge portion being disposed between said wiping and spoiler portions;

at least one carrier operatively supporting and biasing said wiper strip into a predetermined configuration;

a connecting device for connection with a wiper arm;

a microtextured surface impression of a first type formed directly into an outer surface said wiping portion of said flexible material of said wiper strip to reduce total contact area and increase hydrophobicity;

a microtextured surface impression of a second type formed directly into said hinge portion of said flexible material of said wiper strip, wherein said microtextured surface impression of a first type is different from said microtextured surface impression of a second type; and a microtextured surface impression of a third type formed directly into said spoiler portion of said flexible material of said wiping portion, wherein said microtextured surface impression of a third type is different from said microtextured surface impression of a second type and said microtextured surface impression of a first type.

10. The windscreen wiper device as set forth in claim 9 wherein said wiper strip includes a longitudinally extending channel formed into said wiper strip, wherein internal walls of said channel include a microtextured surface impression of a fourth type that is different from said microtextured surface impression of a first type and said microtextured surface impression of a first type.

* * * * *